(12) United States Patent
Oikawa et al.

(10) Patent No.: US 6,250,436 B1
(45) Date of Patent: Jun. 26, 2001

(54) MOTOR-DRIVEN BRAKE APPARATUS (75) Inventors: Hirotaka Oikawa; Tohma Yamaguchi; Youichi Kumemura, all of Kanagawa-ken; Toshio Takayama; Masaru Sakuma, both of Yamanashi-ken, all of (JP)

(73) Assignee: Tokico Ltd., Kawasaki (JP)

( * ) Notice: Subject to any disclaimer, the term of this patent is extended or adjusted under 35 U.S.C. 154(b) by 0 days.

(21) Appl. No.: 09/362,729

(22) Filed: Jul. 29, 1999

(30) Foreign Application Priority Data

Jul. 31, 1998 (JP) .................................................. 10-218317
Mar. 31, 1999 (JP) .................................................. 11-094394

(51) Int. Cl.[7] .................................................. F16D 55/08
(52) U.S. Cl. .................................... 188/72.1; 188/1.11 E; 188/157; 188/162
(58) Field of Search ........................ 188/1.11 W, 1.11 L, 188/1.11 E, 161, 162, 157, 71.7, 71.8, 196 R, 721.1; 303/144

(56) References Cited

U.S. PATENT DOCUMENTS

| | | | | |
|---|---|---|---|---|
| 4,995,483 | * | 2/1991 | Moseley et al. | 188/162 |
| 5,107,967 | * | 4/1992 | Fujita et al. | 188/72.1 |
| 5,788,341 | * | 8/1998 | Penrod et al. | 188/162 |
| 5,829,557 | * | 11/1998 | Halasy-Wimmer et al. | 188/162 |
| 5,957,246 | * | 9/1999 | Suzuki | 188/72.1 |
| 6,000,507 | * | 12/1999 | Bohm et al. | 188/71.8 |

* cited by examiner

*Primary Examiner*—Robert J. Oberleitner
*Assistant Examiner*—Mariano Sy
(74) *Attorney, Agent, or Firm*—Wenderoth, Lind & Ponack, L.L.P.

(57) ABSTRACT

A motor-driven brake apparatus has a motor and a ball screw that converts rotational motion of the motor into rectilinear motion of a screw member. A position detector detects a stroke position of the screw member. A controller controls the motor on the basis of the result of detection by the position detector. The controller controls the motor so as to change the clearance between an inner pad (outer pad) and a disk according to vehicle running conditions.

20 Claims, 9 Drawing Sheets

MOTOR-DRIVEN BRAKE APPARATUS

BACKGROUND OF THE INVENTION

The present invention relates to a motor-driven brake apparatus suitable for use in a vehicle.

In a conventional hydraulic brake apparatus, the return of a piston of a caliper that presses a brake pad depends on the roll-back action of a piston seal. Accordingly, there may be variations in the clearance between the brake pad and a brake rotor when the brake pad is returned. In such a case, even when the brake pedal is not operated, the brake pad may drag owe to runout or variations in wall thickness of the brake rotor.

The drag of the brake pad causes the brake pad to wear even when the brake pedal is not operated. During running of the vehicle, the drag of the brake pad causes the fuel consumption performance to lower. Thus, the brake pad drag impairs economy and may also cause judder.

To solve the above-described problem, motor-driven brake apparatus has heretofore been proposed as a substitute for the hydraulic brake apparatus. The conventional motor-driven brake apparatus has a motor and a converting mechanism for converting rotational motion of the motor into rectilinear motion of a piston. The motor-driven brake apparatus further has a position detector for detecting a stroke position of the piston, and a controller for controlling the motor on the basis of the result of detection by the position detector. In the motor-driven brake apparatus, a pad is pressed against a disk by the rectilinear motion of the piston to generate braking force. In a vehicle, such a motor-driven brake apparatus is provided for each wheel.

In the conventional motor-driven brake apparatus, the advance and retract positions of a brake pad-pressing member of the caliper, i.e. the advance and retract positions of the brake pad, can be controlled by controlling the drive of an electric actuator. Therefore, the brake pad can be retracted to an initial position where the brake pad has a predetermined clearance with respect to the disk rotor such that the brake pad will not drag when the brake pedal is not operated. Accordingly, the above-described problem associated with the hydraulic brake apparatus can be solved.

However, the advantageous feature of the conventional motor-driven brake apparatus is unfavorable from the viewpoint of brake feeling under the following circumstances.

Figure 7:
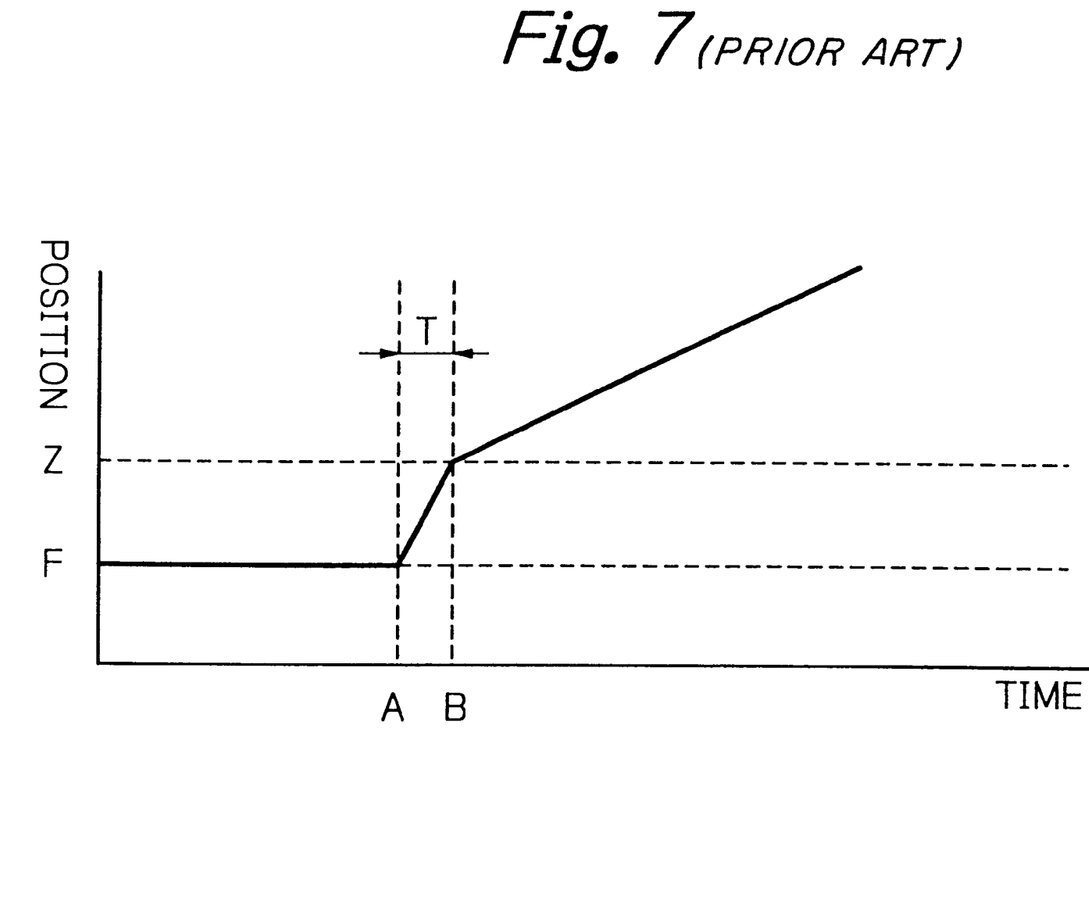
FIG. 7 is a diagram for describing problems associated with a conventional motor-driven brake apparatus.

In the conventional motor-driven brake apparatus, as shown in FIG. 7, when the brake pedal is operated (time A), the electric actuator is driven to move the brake pad from the above-described initial position F to position Z (time B). Therefore, the following problems arise:

(1) The initial response characteristics of the motor-driven brake apparatus degrade by an amount corresponding to a period of time required to reduce the pad clearance.

(2) During the movement of the brake pad for reducing the pad clearance, the brake pad moves from the initial position (where the pad clearance is maintained at the above-described predetermined value) to the zero position (where the brake pad begins to contact the disk rotor) in a state where substantially no resistance is offered to the brake pad, and then rapidly comes into contact with the brake rotor. Therefore, noise is generated when the brake pad contacts the brake rotor.

(3) The presence of the clearance undesirably allows dust or water to enter the space between the brake rotor and the brake pad, resulting in a reduction in the initial braking force, which is applied at the time of initiation of a brake operation. This brings about an adverse effect on the initial response characteristics at the time when the brake pad begins to contact the brake rotor.

(4) When the motor-driven brake apparatus is not used for a long period of time during running of the vehicle, the pad performance of the motor-driven brake apparatus degrades in comparison to a case where the motor-driven brake apparatus is used at moderate frequency.

Furthermore, in the conventional motor-driven brake apparatus, when the brake pedal is not operated, the brake pad is placed at a retract position, that is, the initial position where the brake pad has a predetermined clearance with respect to the disk rotor, as stated above. Therefore, when the motor-driven brake apparatus is not used for a long period of time during running of the vehicle, dust or water collects in the space between the disk and the pad, causing the pad performance of the motor-driven brake apparatus to degrade in comparison to a case where the motor-driven brake apparatus is used at moderate frequency.

SUMMARY OF THE INVENTION

In view of the above-described circumstances, an object of the present invention is to provide a motor-driven brake apparatus improved in both the initial response characteristics and the pad characteristics and designed to reduce noise generated during a brake operation.

Another object of the present invention is to provide a motor-driven brake apparatus capable of preventing degradation of the pad performance even when the motor-driven brake apparatus is not used for a long period of time during running of the vehicle.

The present invention is applied to a motor-driven brake apparatus having a motor and a converting mechanism for converting rotational motion of the motor into rectilinear motion of a piston. The motor-driven brake apparatus further has a position detector for detecting a stroke position of the piston, and a controller for controlling the motor on the basis of the result of detection by the position detector. In the motor-driven brake apparatus, a pad is pressed against a disk by the rectilinear motion of the piston to generate braking force. According to the present invention, the motor-driven brake apparatus includes a running condition detecting device for detecting a running condition of a vehicle. The controller controls the motor so as to change the clearance between the pad and the disk according to the result of detection by the running condition detecting device.

DETAILED DESCRIPTION OF THE INVENTION

Figure 1:
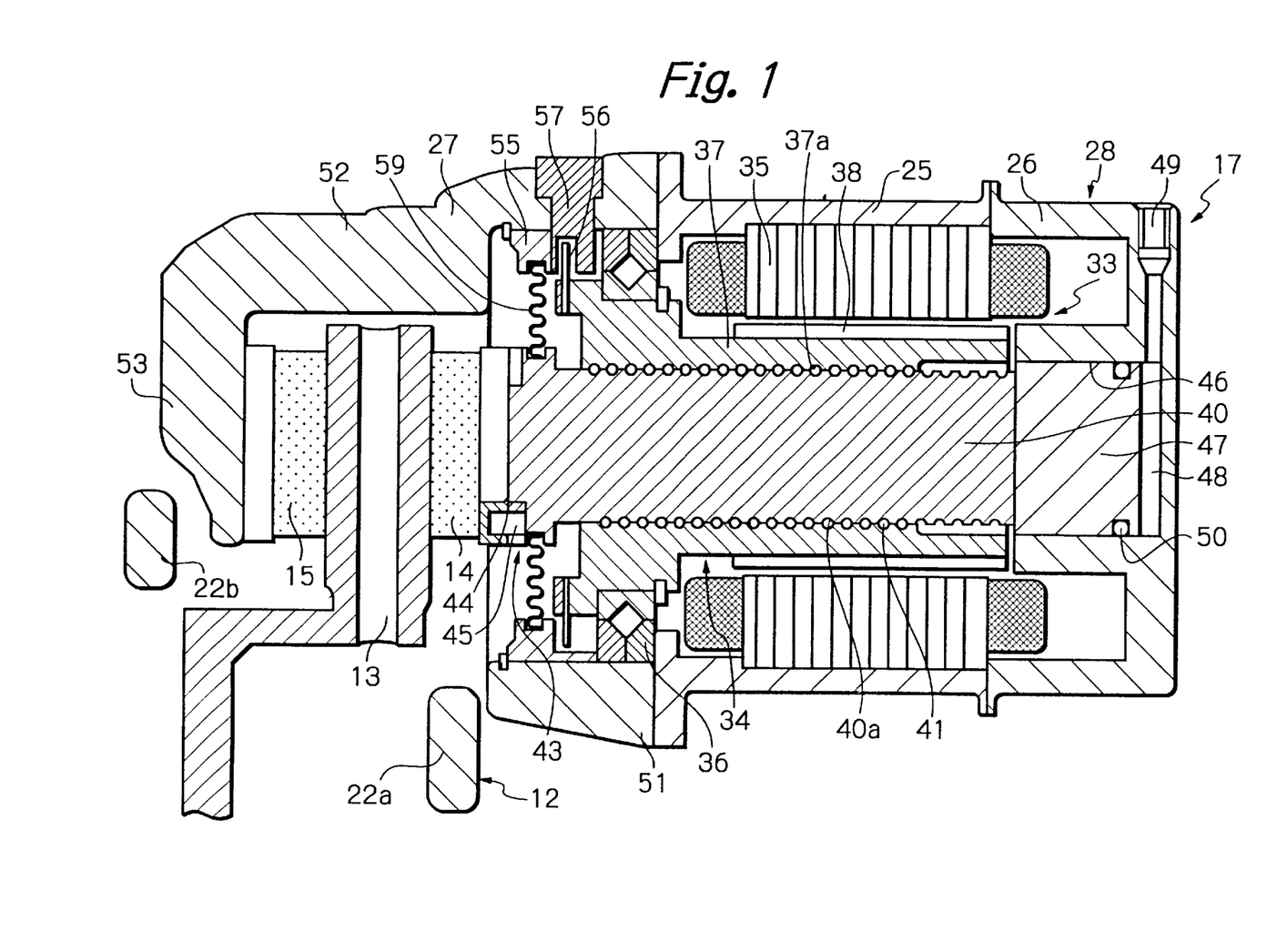
FIG. 1 is a sectional side view showing the arrangement of a motor-driven brake apparatus according to a first embodiment of the present invention.

One embodiment of the motor-driven brake apparatus according to the present invention will be described below with reference to FIGS. 1 and 2.

A motor-driven brake apparatus 11 (see FIG. 2) according to one embodiment of the present invention has a carrier 12 secured to a non-rotating part of a vehicle. A pair of pads (inner pad 14 and outer pad 15) are slidably supported by the carrier 12 on both sides of a disk 13 in such a manner as to face each other across the disk 13 in the axial direction thereof. A caliper 17 is supported by the carrier 12 through two slide guide portions (not shown) so as to be slidable in the axial direction of the disk 13. The caliper 17 is capable of clamping the pads 14 and 15 from both sides thereof.

The carrier 12 has a first connecting portion 22a and a second connecting portion 22b, which are disposed approximately parallel to each other. The carrier 12 further has two support portions (not shown) that connect the first and second connecting portions 22a and 22b at both ends thereof.

The carrier 12 is secured to a vehicle-side member in a state where it is positioned with respect to the disk 13 so that the two support portions lie at the two extremities in the circumferential direction of the disk 13. It should be noted that the slide guide portions are provided in the respective support portions.

A pair of pad guides (not shown) are provided on the respective inner sides of the support portions of the carrier 12 so as to face opposite to each other. The inner pad 14 and the outer pad 15 are supported by the pad guides at both ends thereof so as to be slidable in the axial direction of the disk 13. It should be noted that the inner and outer pads 14 and 15 as supported in this way are restrained from rotating about an axis parallel to the axis of the disk 13.

The caliper 17 has a housing 28. The housing 28 has an approximately cylindrical member 25. A bottom member 26 is secured to one end of the cylindrical member 25 to close it. A distal end member 27 is secured to the other end of the cylindrical member 25.

The housing 28 is provided therein with a motor 33 and a ball screw 34 (converting mechanism) that converts the rotational motion of the motor 33 into rectilinear motion.

The motor 33 has the housing 28 and a coil 35 mounted on the inner peripheral portion of the cylindrical member 25. A bearing 36 is mounted on the distal end member 27 in such a manner as to abut on an end surface of the cylindrical member 25 remote from the bottom member 26. A nut member 37 of the ball screw 34 is rotatably supported through the bearing 36. A magnet 38 is secured to the outer peripheral portion of the nut member 37 so as to lie inside the coil 35.

The ball screw 34 has the nut member 37 having an internal thread 37a formed on the inner peripheral portion thereof. A screw member 40 serving as a piston is disposed inside the nut member 37. The screw member 40 has an external thread 40a formed on the outer peripheral portion thereof. Balls 41 are interposed between the internal thread 37a of the nut member 37 and the external thread 40a of the screw member 40.

The screw member 40 and the inner pad 14 are provided with a detent mechanism 43 that allows the screw member 40 and the inner pad 14 to separate from each other by a predetermined distance in the axial direction of the disk 13 while limiting relative rotation of these members. Thus, the screw member 40 is restrained from rotating about an axis parallel to the axis of the disk 13.

It should be noted that the detent mechanism 43 comprises a groove 44 formed in the screw member 40 and a projection 45 formed on the inner pad 14 so as to slidably fit in the groove 44.

The bottom member 26 is provided with a cylinder hole 46 that is coaxial with respect to the axis of the motor 33. The cylinder hole 46 is slidably fitted with a hydraulic piston 47 that is able to abut on the screw member 40. The hydraulic piston 47 forms a chamber 48 in the cylinder hole 46. The bottom member 26 is provided with a port 49 that allows the chamber 48 to communicate with the outside. It should be noted that a seal member 50 is provided on the outer peripheral portion of the hydraulic piston 47 to seal a gap between the outer peripheral portion and the inner peripheral portion of the cylinder hole 46.

As stated above, the distal end member 27 is secured to the end of the cylindrical member 25 remote from the bottom member 26. The distal end member 27 has an approximately cylindrical portion 51 secured to the cylindrical member 25 in approximately coaxial relation to the latter. A disk pass portion 52 extends from one radial side of the cylindrical portion 51 away from the cylindrical member 25. A claw portion 53 extends from the distal end of the disk pass portion 52 so as to face opposite to the cylindrical portion 51.

The above-described bearing 36 is fitted on the inner peripheral portion of the cylindrical portion 51 of the distal end member 27. In addition, a mounting member 55 is secured to the inner peripheral portion of the cylindrical portion 51 in close proximity to the bearing 36 to clamp the bearing 36 between the mounting member 55 and the end surface of the cylindrical member 25. A position detector 57 is secured to the mounting member 55. The position detector 57 detects a rotational position of a rotary disk 56 secured to the nut member 37, thereby detecting a rotational position of the nut member 37, and thus detecting a stroke position of the screw member 40.

In a state where the caliper 17 is supported by the carrier 12, the motor 33 and the ball screw 34 have their respective axes extending parallel to the axis of the disk 13, and the ball screw 34 has the screw member 40 placed opposite to the inner pad 14 so as to be able to abut on a side of the inner pad 14 remote from the disk 13. Regarding the distal end member 27, the disk pass portion 52 extends over the outer peripheral portion of the disk 13, and the claw portion 53 is disposed opposite to the outer pad 15 so as to be able to abut on a side of the outer pad 15 remote from the disk 13.

A dust boot 59 is provided between the inner peripheral portion of the mounting member 55 and the outer peripheral portion of the screw member 40 of the ball screw 34 to prevent dust or other foreign matter from entering the thread engagement portion of the ball screw 34 or other portions thereof.

Figure 2:
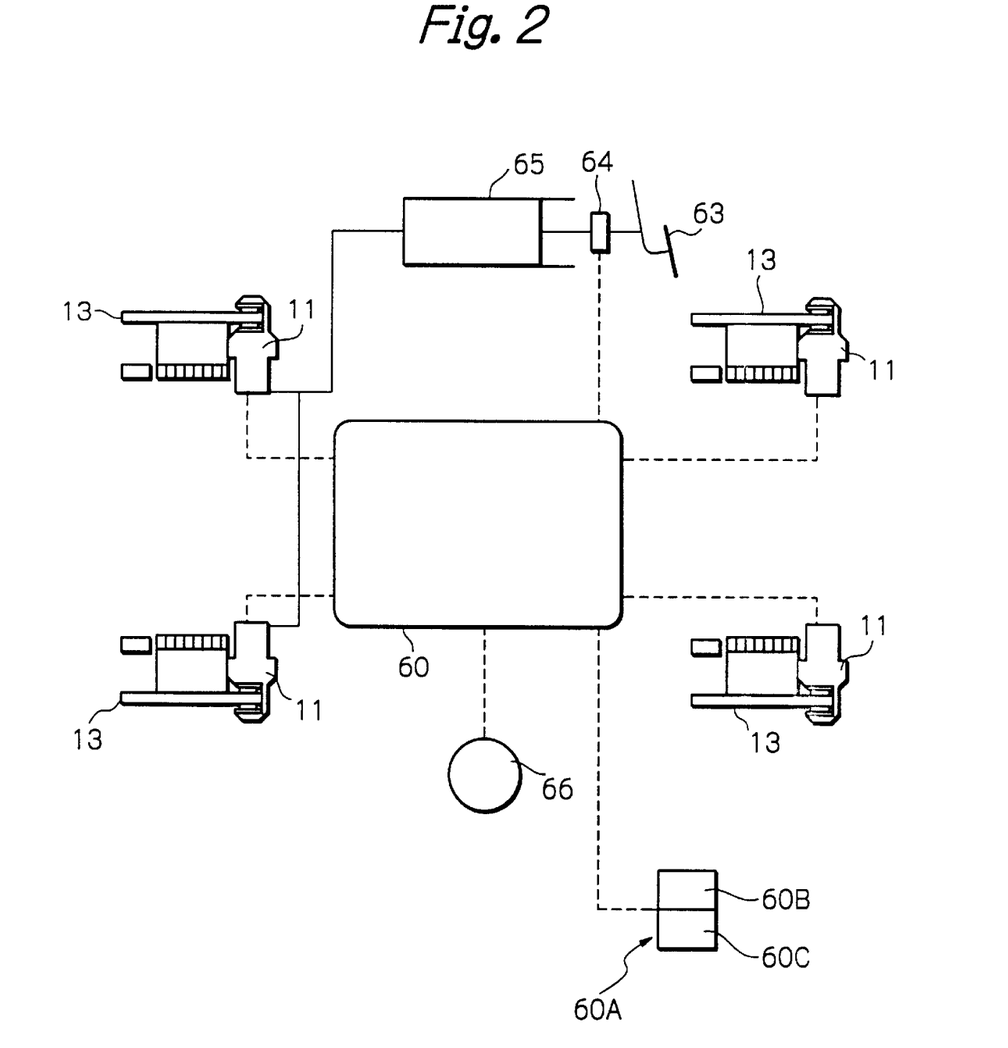
FIG. 2 is a schematic view showing a brake system to which the motor-driven brake apparatus according to the present invention is applied.

As shown in FIG. 2, the motor-driven brake apparatus 11, which is arranged as stated above, is provided for each of four wheels (two front wheels and two rear wheels) of the vehicle. The motors 33 and position detectors 57 of all the motor-driven brake apparatuses 11 are connected to a controller 60. Each motor 33 is connected to a motor driver (not shown) that is provided in the controller 60 to drive the associated motor 33.

In FIG. 2, reference numeral 63 denotes a brake pedal operated by the driver to actuate the motor-driven brake apparatuses 11. An operating quantity detecting sensor 64 detects an amount by which the brake pedal 63 is depressed. A master cylinder 65 produces a brake fluid pressure according to the brake pedal operating quantity. An alarm lamp 66 gives a warning indication to the driver as occasion arises. Of all the motor-driven brake apparatuses 11, those which are provided for the two front wheels are supplied with the brake fluid pressure from the master cylinder 65, which is introduced into the chamber 48 through the port 49. It should be noted that the chamber 48, the port 49 and the hydraulic piston 47 may be omitted from the motor-driven brake apparatuses 11 provided for the two rear wheels because the brake fluid pressure from the master cylinder 65 is not introduced into these motor-driven brake apparatuses 11.

As shown in FIG. 2, the controller 60 is connected with a running condition detecting device 60A that detects running conditions of the vehicle. In this embodiment, the running condition detecting device 60A includes a running detecting sensor 60B for detecting whether or not the vehicle is running, and an accelerator pedal operating condition detecting sensor 60C for detecting an ON/OFF operation of the accelerator pedal. These sensors may adopt generally known detecting mechanisms.

Next, the operation of the motor-driven brake apparatus according to the foregoing embodiment will be described with reference to the flowchart shown in FIG. 3.

Figure 3:
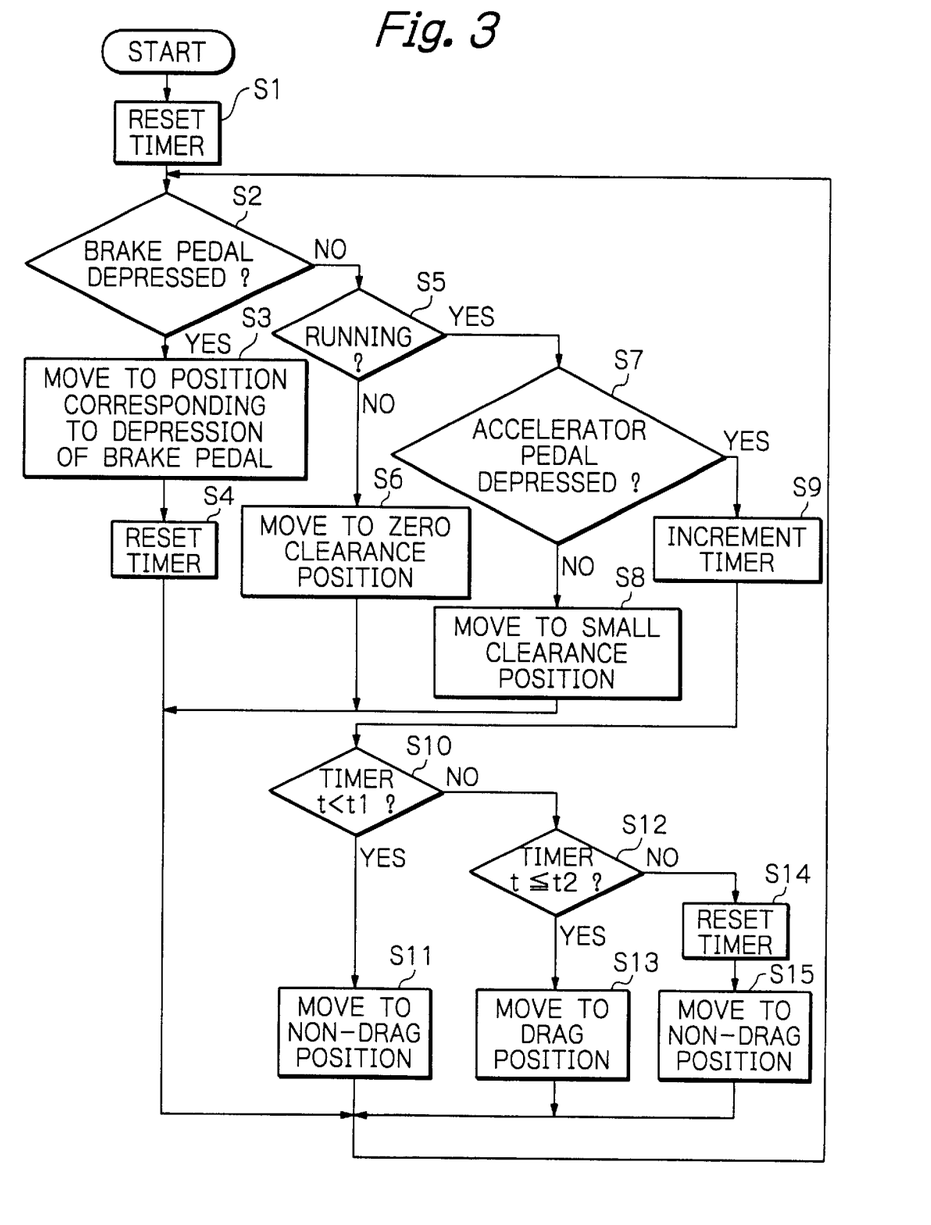
FIG. 3 is a flowchart for describing the operation of the motor-driven brake apparatus according to the first embodiment.

In the system shown in FIG. 2, when an ignition switch (not shown) is turned on, the controller 60 resets a timer (not shown) at step S1 shown in FIG. 3, and then proceeds to step S2. At step S2, the controller 60 judges whether or not the brake pedal 63 is in a depressed state from an output signal from a brake pedal switch (not shown). The brake pedal switch outputs an ON signal when the brake pedal 63 is depressed. When the brake pedal 63 is not depressed, the brake pedal switch outputs an OFF signal.

If the driver steps on the brake pedal 63, an ON signal is output from the brake pedal switch. Consequently, the controller 60 decides that the result of the judgment at step S2 is "YES", and proceeds to step S3. At step S3, the controller 60 FIGS. 6(a)–(b) are diagrams the motor 33 for each motor-driven brake apparatus 11 on the basis of rotational position data from the position detector 57 so that braking force acts on each wheel according to the amount of depression of the brake pedal 63, which is detected with the operating quantity detecting sensor 64. Thereafter, the controller 60 proceeds to step S4.

That is, with respect to the motor-driven brake apparatuses 11 for the two rear wheels, the controller 60 controls the motors 33 so that necessary braking force is produced by only the motor-driven brake apparatuses 11. With respect to the motor-driven brake apparatuses 11 for the two front wheels, the controller 60 controls the motors 33 so that the motor-driven brake apparatuses 11 produce braking force supplementary to braking force derived from the brake fluid pressure produced by the master cylinder 65 to obtain necessary braking force.

To generate braking force, the controller 60 drives the motor 33 to rotate the nut member 37 of the ball screw 34 in the forward direction. Consequently, the screw member 40, which is restrained from rotating by the detent mechanism 43, moves toward the disk 13, causing the inner pad 14 to come into contact with the disk 13. Meanwhile, counterforce that is produced at this time causes the caliper 17 to move relative to the carrier 12. This causes the claw portion 53 to move toward the disk 13. Thus, the inner pad 14 and the outer pad 15 are pressed toward the disk 13 by the screw member 40 and the claw portion 53. Eventually, the pads 14 and 15 come into contact with the disk 13, thus producing braking force.

In each motor-driven brake apparatus 11 in which the brake fluid pressure from the master cylinder 65 is introduced into the chamber 48, propulsion force derived from the brake fluid pressure is transmitted to the screw member 40 through the hydraulic piston 47 in addition to the above-described propulsion force from the motor 33. The ball screw 34 can convert rotational motion into rectilinear motion, and vice versa. Therefore, the screw member 40 is caused to rotate relative to the nut member 37 by the propulsion force derived from the brake fluid pressure, and while doing so, the screw member 40 is caused to move toward the disk 13 by the propulsion force from the motor 33, thereby causing the pads 14 and 15 to be pressed against the disk 13, and thus producing braking force.

To cancel the braking force in this state, the controller 60 drives the motor 33 to rotate the nut member 37 in a direction reverse to the forward direction. Consequently, the screw member 40, which is restrained from rotating, moves away from the disk 13. As a result, the inner pad 14 and the outer pad 15 separate from the disk 13 to cancel the braking force. In each motor-driven brake apparatus 11 in which the brake fluid pressure from the master cylinder 65 has been introduced into the chamber 48, the brake fluid pressure is also reduced to cancel the braking force.

At step S4, the controller 60 resets the timer. Thereafter, the controller 60 returns to step S2 and repeats the above-described operation.

If the brake pedal 63 is not depressed, the controller 60 decides that the result of the judgment at step S2 is "NO", and proceeds to step S5. At step S5, the controller 60 judges whether or not the vehicle is running from an output signal from a rotation sensor serving as the running detecting sensor 60B. The rotation sensor detects rotation of the disk 13.

Figure 4:
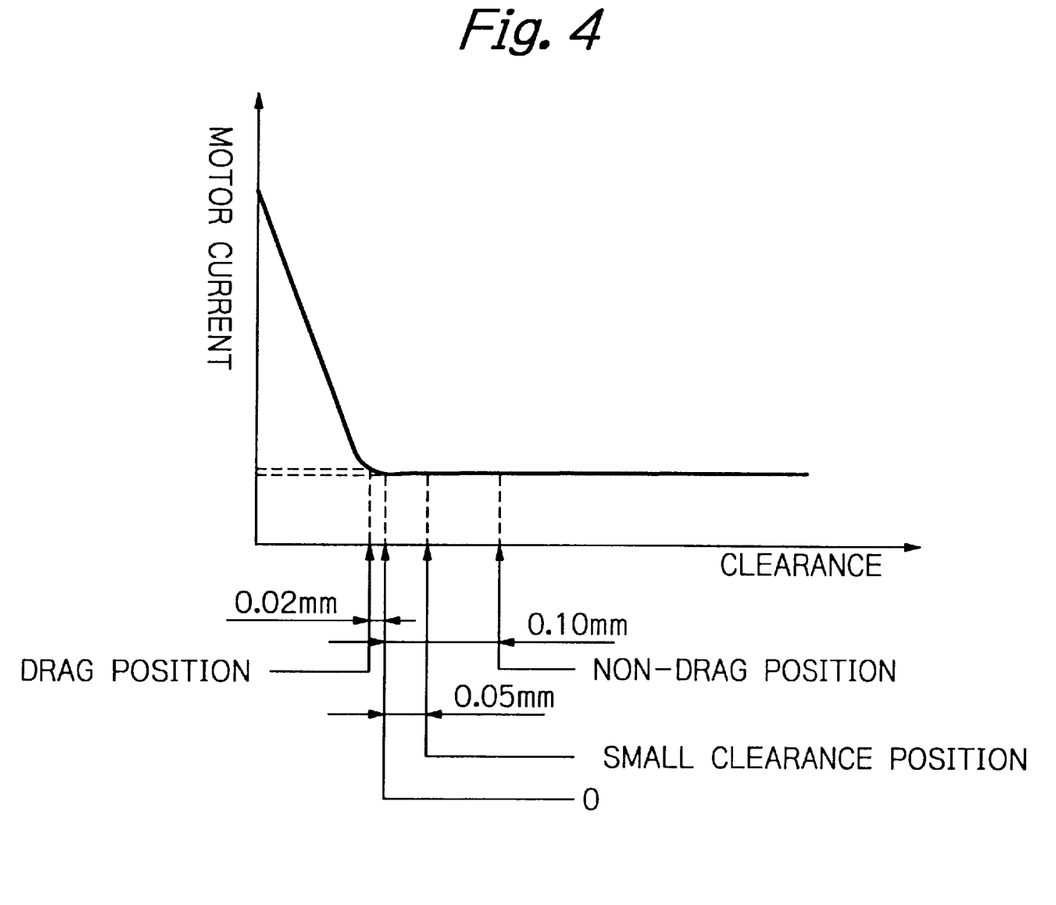
FIG. 4 is a characteristic diagram showing the relationship between the rotor-pad clearance and the motor current in the motor-driven brake apparatus according to the first embodiment.

If the vehicle is at rest, the controller 60 decides that the result of the judgment at step S5 is "NO" from the output signal from the rotation sensor, and proceeds to step S6. At step S6, the controller 60 controls the motor current supplied to the motor 33, while receiving a feedback signal from the position detector 57, so that the clearance between the disk 13 and the inner pad 14 (outer pad 15) becomes zero as shown in FIG. 4. Thereafter, the controller 60 returns to step S2, and repeats the above-described operation. Thus, the inner pad 14 and the outer pad 15 are moved through the above-described operation. As a result, the clearance between the disk 13 and the inner pad 14 (outer pad 15) is made zero.

In this case, because the clearance is zero, it is possible to prevent dust or water from entering the area between the disk 13 and the inner pad 14 (outer pad 15). This is particularly useful in cold districts because it is possible to prevent freezing of water that would otherwise enter the space between the disk 13 and the inner pad 14 (outer pad 15). In this case, therefore, the initial braking force at the time of initiation of a brake operation can be improved. In addition, it is possible to improve the initial response characteristics at the time when the inner pad 14 (outer pad 15) begins to contact the disk 13.

If the vehicle is running, the controller 60 decides that the result of the judgment at step S5 is "YES" from the output signal from the rotation sensor, and proceeds to step S7. At step S7, the controller 60 judges whether or not the accelerator pedal (not shown) is in a depressed state from an output signal from an accelerator pedal switch serving as the accelerator pedal operating condition detecting sensor 60C. The accelerator pedal switch outputs an ON signal when the accelerator pedal is depressed. When the accelerator pedal is not depressed, the accelerator pedal switch outputs an OFF signal.

If the accelerator pedal is not depressed, i.e. if the accelerator pedal is in a released position, the controller 60 decides the result of the judgment at step S7 is "NO", and proceeds to step S8. At step S8, the controller 60 controls the motor current supplied to the motor 33, while receiving a feedback signal from the position detector 57, so that the clearance between the disk 13 and the inner pad 14 (outer pad 15) becomes small (0.05 mm) as shown in FIG. 4. Thereafter, the controller 60 returns to step S2, and repeats the above-described operation. This is based on the fact that when the accelerator pedal is not depressed during running of the vehicle, there is a strong possibility that the brake pedal will be depressed immediately after that.

Figure 5:
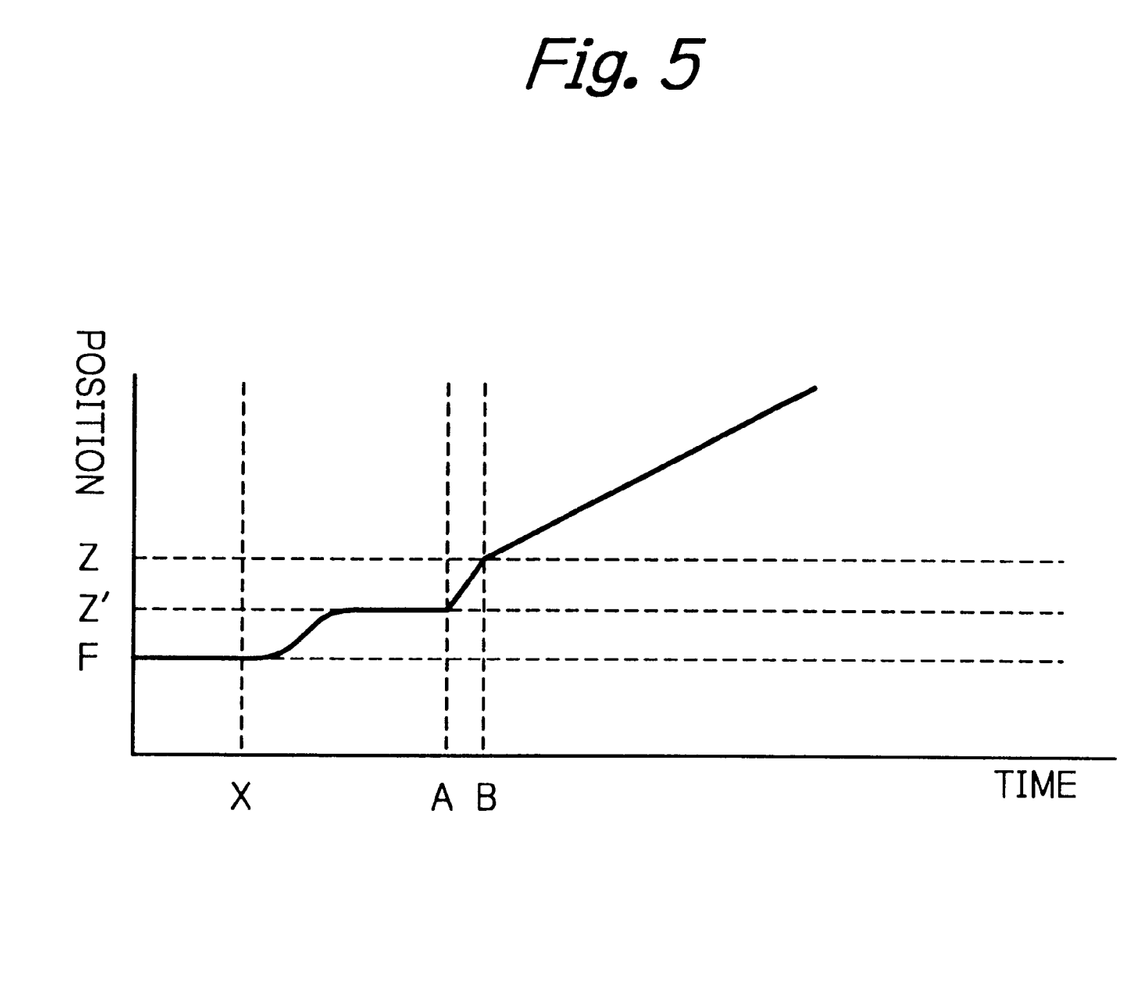
FIG. 5 is a diagram showing the pad position in the motor-driven brake apparatus according to the first embodiment.

At this time, the inner pad 14 (outer pad 15) is moved from position F (time X), which is shown in FIG. 5, to position Z' (time A). During this movement, the motor 33 can be controlled so that the inner pad 14 (outer pad 15) shows a smooth moving characteristic curve as shown in FIG. 5. The absolute value of the difference between position Z' and position Z (shown in FIG. 5) where the clearance is zero is 0.05 mm as shown in FIG. 4. In this case, because the clearance is set to a small value, even if the brake pedal is depressed suddenly, the inner pad 14 (outer pad 15) comes into contact with the disk 13 in an extremely short period of time. Therefore, the brake initial response characteristics improve.

In this case, because the distance through which the inner pad 14 (outer pad 15) moves without meeting resistance is short, the speed of movement of the inner pad 14 (outer pad 15) will not become excessively high before it comes into contact with the disk 33. Accordingly, it is possible to reduce noise generated when the inner pad 14 (outer pad 15) comes into contact with the disk 13. It should be noted that in FIGS. 5 and 7 the section AB is shown schematically by a straight line for the purpose of facilitating understanding of the pad movement, and that the speed with which the inner pad 14 (outer pad 15) comes into contact with the disk 13 differs in FIGS. 5 and 7 as stated above.

If the accelerator pedal is in a depressed state, the controller 60 decides that the result of the judgment at step S7 is "YES", and proceeds to step S9. At step S9, the controller 60 increments the timer value t of the timer, and then proceeds to step S10. At step S10, the controller 60 judges whether or not the timer value t is less than a first set time t1, which has been set in advance. If "YES" is the answer, the controller 60 proceeds to step S11.

At step S11, the controller 60 controls the motor current supplied to the motor 33, while receiving a feedback signal from the position detector 57, so that the clearance between the disk 13 and the inner pad 14 (outer pad 15) becomes 0.1 mm as shown in FIG. 4. Thereafter, the controller 60 returns to step S2, and repeats the above-described operation. Thus, the inner pad 14 and the outer pad 15 are moved through the above-described operation. As a result, the clearance between the disk 13 and the inner pad 14 (outer pad 15) is set to 0.1 mm. That is, in this case, the disk 13 and the inner pad 14 (outer pad 15) are completely out of contact with each other (non-drag position). This position corresponds to a position where the brake is inoperative in the prior art.

If the timer value t of the timer is not less than the first set time t1, the controller 60 decides that the result of the judgment at step S10 is "NO", and proceeds to step S12. At step S12, the controller 60 judges whether or not the timer value t of the timer is not more than a second set time t2 (>t1), which has been set in advance. If "YES" is the answer at step S12, the controller 60 proceeds to step S13. At step S13, the controller 60 controls the motor current supplied to the motor 33, while receiving a feedback signal from the position detector 57, so that the clearance between the disk 13 and the inner pad 14 (outer pad 15) is 0.02 mm in the negative direction with respect to the reference point 0 as shown in FIG. 4. Thereafter, the controller 60 returns to step S2, and repeats the above-described operation.

Thus, the inner pad 14 and the outer pad 15 are moved through the above-described operation. Consequently, the inner pad 14 (outer pad 15) is brought into contact with the disk 13 and placed in a drag position. Accordingly, frictional heat is generated by the contact between the disk 13 and the inner pad 14 (outer pad 15). As a result, the temperature of the disk 13, the inner pad 14 and the outer pad 15 rises to a temperature desirable for the pads 14 and 15 to exhibit the required braking performance. In this case, therefore, the pad performance will not be degraded by cooling even when the motor-driven brake apparatus is not used for a long period of time during running of the vehicle.

If the timer value t of the timer is more than the second set time t2, the controller 60 proceeds to step S14. At step S14, the controller 60 resets the timer, and then proceeds to step S15. At step S15, the controller 60 controls the motor current supplied to the motor 33, while receiving a feedback signal from the position detector 57, so that the clearance between the disk 13 and the inner pad 14 (outer pad 15) becomes 0.1 mm as shown in FIG. 4. Thereafter, the controller 60 proceeds to step S2, and repeats the above-described operation.

Although the motor-driven brake apparatus according to one embodiment of the present invention has been detailed above, it should be noted that the present invention is not necessarily limited to the foregoing embodiment, and that various changes and modifications may be imparted thereto without departing from the gist of the present invention.

Figure 6A:
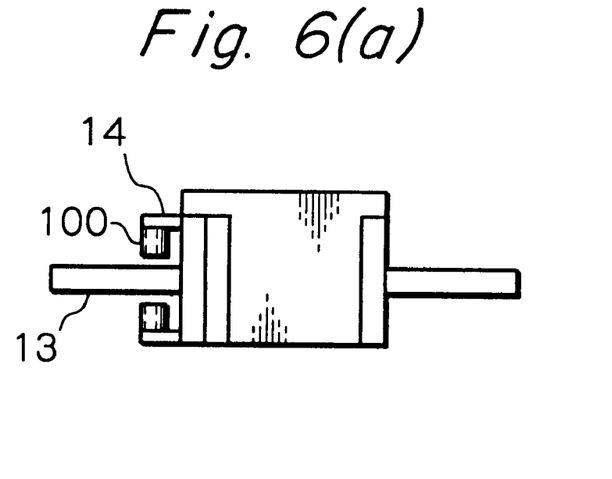
FIGS. 6(a)–(b) are diagrams showing a modification of the motor-driven brake apparatus according to the first embodiment.
Figure 6B:
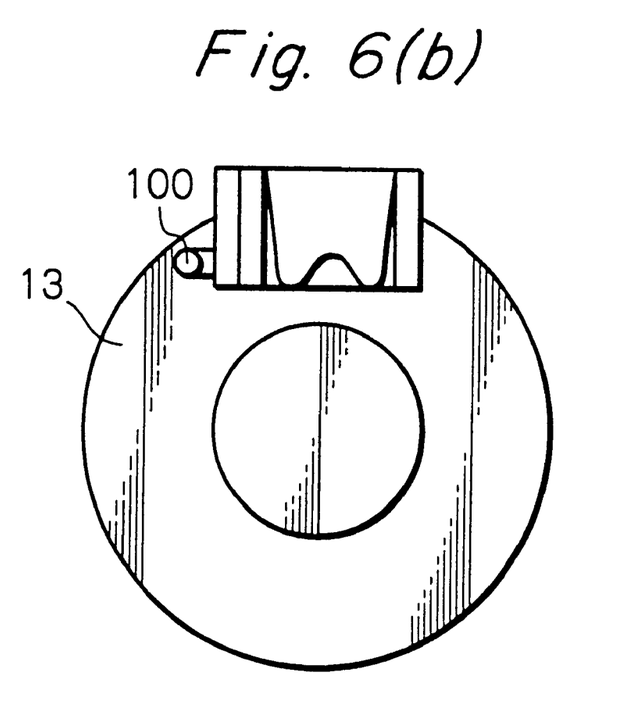

For example, the motor-driven brake apparatus according to the above-described embodiment may be arranged such that a displacement sensor 100 as shown in parts (a) and (b) of FIG. 6 is provided in the vicinity of the disk 13, and the clearance between the disk 13 and the inner pad 14 is obtained from the result of detection by the displacement sensor 100, and then clearance control is carried out by the controller 60 on the basis of the clearance thus obtained.

FIG. 6(*a*) is a plan view showing the arrangement of the disk 13 and the displacement sensor 100. FIG. 6(*b*) is a side view showing the arrangement of the disk 13 and the displacement sensor 100. The displacement sensor 100 is a sensor that detects an amount of displacement of the inner pad 14 in the axial direction, which is provided in the vicinity of the disk 13.

Although in the motor-driven brake apparatus according to the foregoing embodiment specific numerical values (0.02 mm, 0.10 mm, and 0.05 mm) for the clearance are shown with reference to FIG. 4, it should be noted that each clearance value is merely an example, and that the present invention is not necessarily limited to these numerical values.

Accordingly, each of the above-described clearance values may be appropriately determined on the basis of various experimental data. Any numerical values may be used as long as the size relationship between the values agrees with the size relationship between the specific numerical values shown in FIG. 4.

As has been stated above, according to the present invention, the clearance between the pad and the disk is changed according to the running conditions of the vehicle. Therefore, it is possible to improve the initial response characteristics and the pad characteristics and also possible to reduce noise generated during a brake operation.

In one example, when the vehicle is running, the controller controls the motor so that the clearance between the pad and the disk becomes very small. In this case, even if the brake pedal is suddenly depressed, the pad comes into contact with the disk in an extremely short period of time. Therefore, the brake initial response characteristics improve, and it is also possible to reduce noise generated when the pad contacts the disk.

In another example, when the vehicle is at rest, the controller controls the motor so that the clearance between the pad and the disk becomes zero. Thus, it is possible to prevent dust or water from entering the area between the disk and the pad. Furthermore, it is possible to improve the initial braking force at the time of initiation of a brake operation. In addition, it is possible to improve the initial response characteristics at the time when the pad begins to contact the disk.

In another example, when the vehicle has been running in a non-braked state for a period of time longer than a predetermined time, the controller controls the motor to reduce the clearance between the pad and the disk so that the pad slightly contacts the disk. Consequently, the pad and the disk are placed in a drag position, and thus frictional heat is generated by the contact between the disk and the pad, resulting in a rise in temperature. Accordingly, even when the motor-driven brake apparatus is not used for a long period of time during running of the vehicle, the pad performance will not degrade. Moreover, substances attached to the pad can be removed.

Next, the operation of a motor-driven brake apparatus according to a second embodiment of the present invention will be described with reference to the flowchart shown in FIG. 8.

Figure 8:
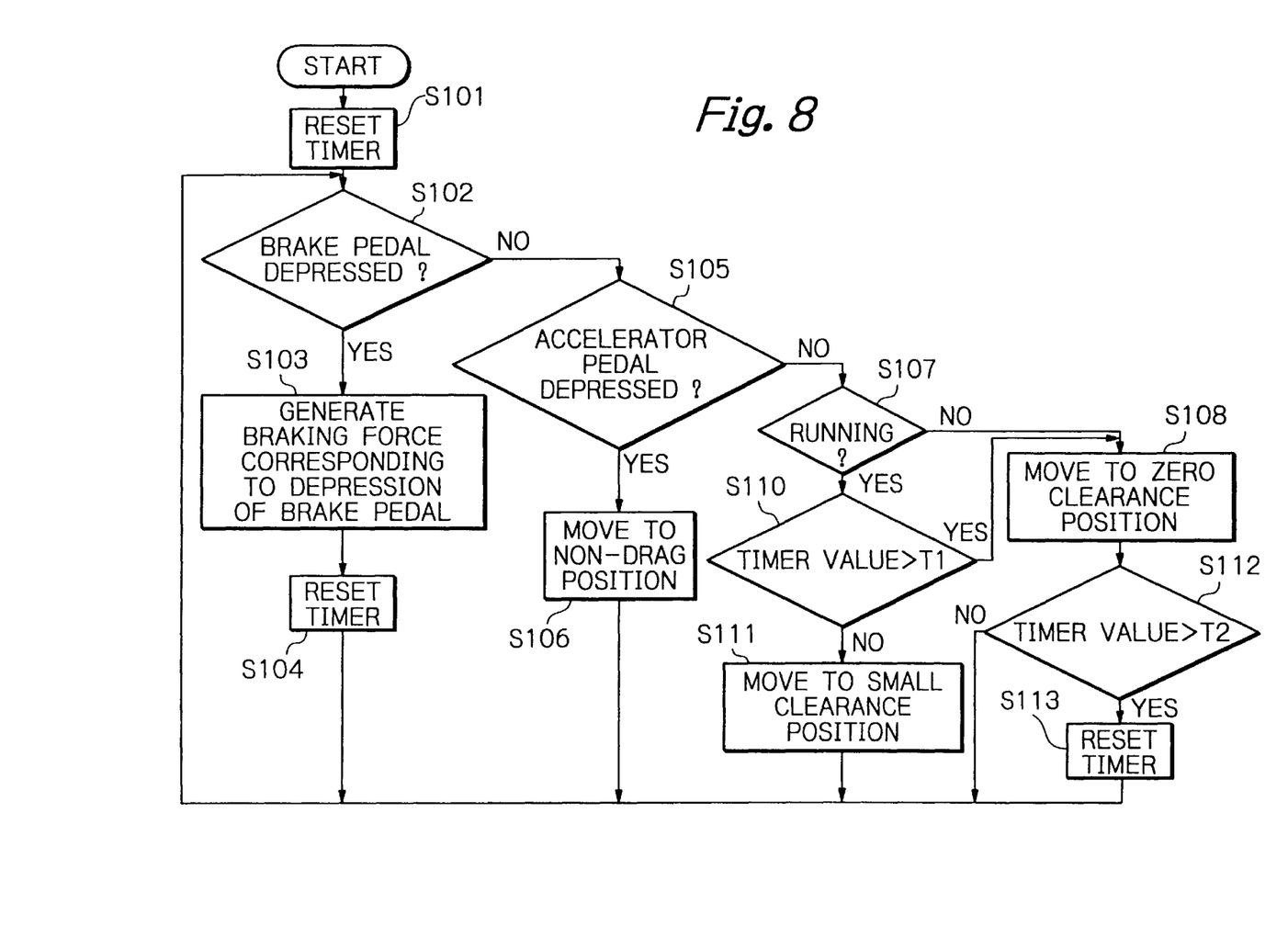
FIG. 8 is a flowchart showing the operation of a motor-driven brake apparatus according to a second embodiment of the present invention.

When an ignition switch (not shown) is turned on, the controller 60 resets a timer (not shown) at step S101 shown in FIG. 8, and then proceeds to step S102. At step S102, the controller 60 judges whether or not the brake pedal 63 is in a depressed state from an output signal from a brake pedal switch (not shown). The brake pedal switch outputs an ON signal when the brake pedal 63 is depressed. When the brake pedal 63 is not depressed, the brake pedal switch outputs an OFF signal.

If the driver steps on the brake pedal 63, an ON signal is output from the brake pedal switch. Consequently, the controller 60 decides that the result of the judgment at step S102 is "YES", and proceeds to step S103. At step S103, the controller 60 feedback-controls the motor 33 on the basis of rotational position data from the position detector 57 for each motor-driven brake apparatus 11 so that braking force acts on each wheel according to the amount of depression of the brake pedal 63, which is detected by the operating quantity detecting sensor 64. Thereafter, the controller 60 proceeds to step S104.

More specifically, the controller 60 executes step S103 as follows: With respect to the motor-driven brake apparatuses 11 for the two rear wheels, the controller 60 controls the motors 33 so that necessary braking force is produced by only the motor-driven brake apparatuses 11. With respect to the motor-driven brake apparatuses 11 for the two front wheels, the controller 60 controls the motors 33 so that the motor-driven brake apparatuses 11 produce braking force supplementary to braking force derived from the brake fluid pressure produced by the master cylinder 65 to obtain necessary braking force.

At step S104, the controller 60 resets the timer. Thereafter, the controller 60 returns to step S102, and repeats the above-described operation.

If the brake pedal 63 is not depressed, the controller 60 decides that the result of the judgment at step S102 is "NO", and proceeds to step S105. At step S105, the controller 60 judges whether or not an accelerator pedal (not shown) is in a depressed state from an output signal from an accelerator pedal switch (not shown). The accelerator pedal switch outputs an ON signal when the accelerator pedal is depressed. When the accelerator pedal is not depressed, the accelerator pedal switch outputs an OFF signal.

If the accelerator pedal is in a depressed state, the controller 60 decides that the result of the judgement at step S105 is "YES", and proceeds to step S106. At step S106, the controller 60 controls the motor current supplied to the motor 33, while receiving a feedback signal from the 15 position detector 57, so that the clearance between the disk 13 and the inner pad 14 (outer pad 15) becomes 0.1 mm as shown in FIG. 4. Thereafter, the controller 60 returns to step S102, and repeats the above-described operation. Thus, the inner pad 14 and the outer pad 15 are moved through the above-described operation. As a result, the clearance between the disk 13 and the inner pad 14 (outer pad 15) is set to 0.1 mm. That is, in this case, the disk 13 and the inner pad 14 (outer pad 15) are completely out of contact with each other (non-drag position). As a result, drag is minimized during the normal running of the vehicle. Therefore, the fuel consumption is improved.

If the accelerator pedal is not depressed, that is, if the accelerator pedal is in a released position, the controller 60 decides that the result of the judgment at step S105 is "NO", and proceeds to step S107. At step S107, the controller 60 judges whether or not the vehicle is running from an output signal from a rotation sensor (not shown). The rotation sensor detects rotation of the disk 13.

If the vehicle is at rest, the controller 60 decides that the result of the judgment at step S107 is "NO" from the output signal from the rotation sensor, and proceeds to step S108. At step S108, the controller 60 controls the motor current supplied to the motor 33, while receiving a feedback signal from the position detector 57, so that the clearance between the disk 13 and the inner pad 14 (outer pad 15) becomes zero as shown in FIG. 4. That is, the controller 60 controls the motor current so that the disk 13 and the inner pad 14 (outer pad 15) slightly contact each other (including the 0.02-mm overlap position). Thereafter, the controller 60 resets the timer (not shown). Then, the controller 60 returns to step S102, and repeats the above-described operation. Thus, the inner pad 14 and the outer pad 15 are moved through the above-described operation. As a result, the clearance between the disk 13 and the inner pad 14 (outer pad 15) is made zero.

It should be noted that in the foregoing description the zero clearance position includes the 0.02-mm overlap position, where the inner pad 14 (outer pad 15) slightly contacts the disk 33, because in the foregoing the zero clearance position is detected by a change in the motor current supplied to the motor 33, by way of example. The zero clearance position may be only the "zero clearance position" in the original sense of the term, exclusive of the 0.02-mm overlap position, as a matter of course.

In this case, because the clearance is zero, it is possible to prevent dust or water from entering the area between the disk 13 and the inner pad 14 (outer pad 15) and also possible to prevent freezing. In this case, therefore, the initial braking force at the time of initiation of a brake operation can be improved. In addition, it is possible to improve the initial response characteristics at the time when the inner pad 14 and the outer pad 15 begins to contact the disk 13.

If the vehicle is running, the controller 60 decides that the result of the judgment at step S107 is "YES" from the output signal from the rotation sensor, and proceeds to step S110. At step S110, the controller 60 judges whether or not the timer value is larger than a predetermined value T1, which has been set in advance. The timer measures a period of time when the motor-driven brake apparatus is not used [i.e. the disk 13 and the inner pad 14 (outer pad 15) are out of contact with each other]. That is, the controller 60 judges whether or not the motor-driven brake apparatus has been in a non-used state for a period of time that can be used as a criterion for judging that it is necessary to carry out performance degradation preventing control (described later). If the timer value is larger than the predetermined value T1at step S110, the controller 60 executes step S108. At step S108, the controller 60 controls the motor current supplied to the motor 33, while receiving a feedback signal from the position detector 57, so that the clearance between the disk 13 and the inner pad 14 (outer pad 15) becomes zero as shown in FIG. 4, that is, the disk 13 and the inner pad 14 (outer pad 15) slightly contact each other (including the 0.02-mm overlap position). Thereafter, the controller 60 judges at step S112 whether or not the timer value is larger than a predetermined value T2 (>T1). If "YES", that is, if time T2 has elapsed, the controller 60 resets the timer (not shown) at step S113. Thereafter, the controller 60 returns to step S102, and repeats the above-described operation. Thus, the inner pad 14 and the outer pad 15 are moved through the above-described operation. As a result, the clearance between the disk 13 and the inner pad 14 (outer pad 15) is made zero. That is, the inner pad 14 (outer pad 15) slightly contacts the disk 13.

Thus, performance degradation preventing control is carried out in which the motor 33 is controlled to reduce clearance between the disk 13 and the inner pad 14 (outer pad 15) so that the inner pad 14 (outer pad 15) slightly contacts the disk 13. Consequently, the inner pad 14 (outer pad 15) is temporarily placed in a drag position with respect to the disk 13. Thus, cleaning is carried out to remove dust and water from the area between the disk 13 and the inner pad 14 (outer pad 15). Accordingly, even when the motor-driven brake apparatus is not used for a long period of time during running of the vehicle, the pad performance is prevented from degrading. Thus, the motor-driven brake apparatus can surely exhibit the required braking force.

If the timer value is not larger than the predetermined value T1, the controller 60 decides that the result of the judgment at step S110 is "NO", and proceeds to step S111. That is, the purpose of the judgment at step S110 is to prevent wear of the inner pad 14 and the outer pad 15 which would occur if the performance degradation preventing control is carried out more frequently than is necessary. At step S111, the controller 60 controls the motor current supplied to the motor 33, while receiving a feedback signal from the position detector 57, so that the clearance between the disk 13 and the inner pad 14 (outer pad 15) becomes small (0.05 mm) as shown in FIG. 4. Thereafter, the controller 60 returns to step S102, and repeats the above-described operation.

Figure 9:
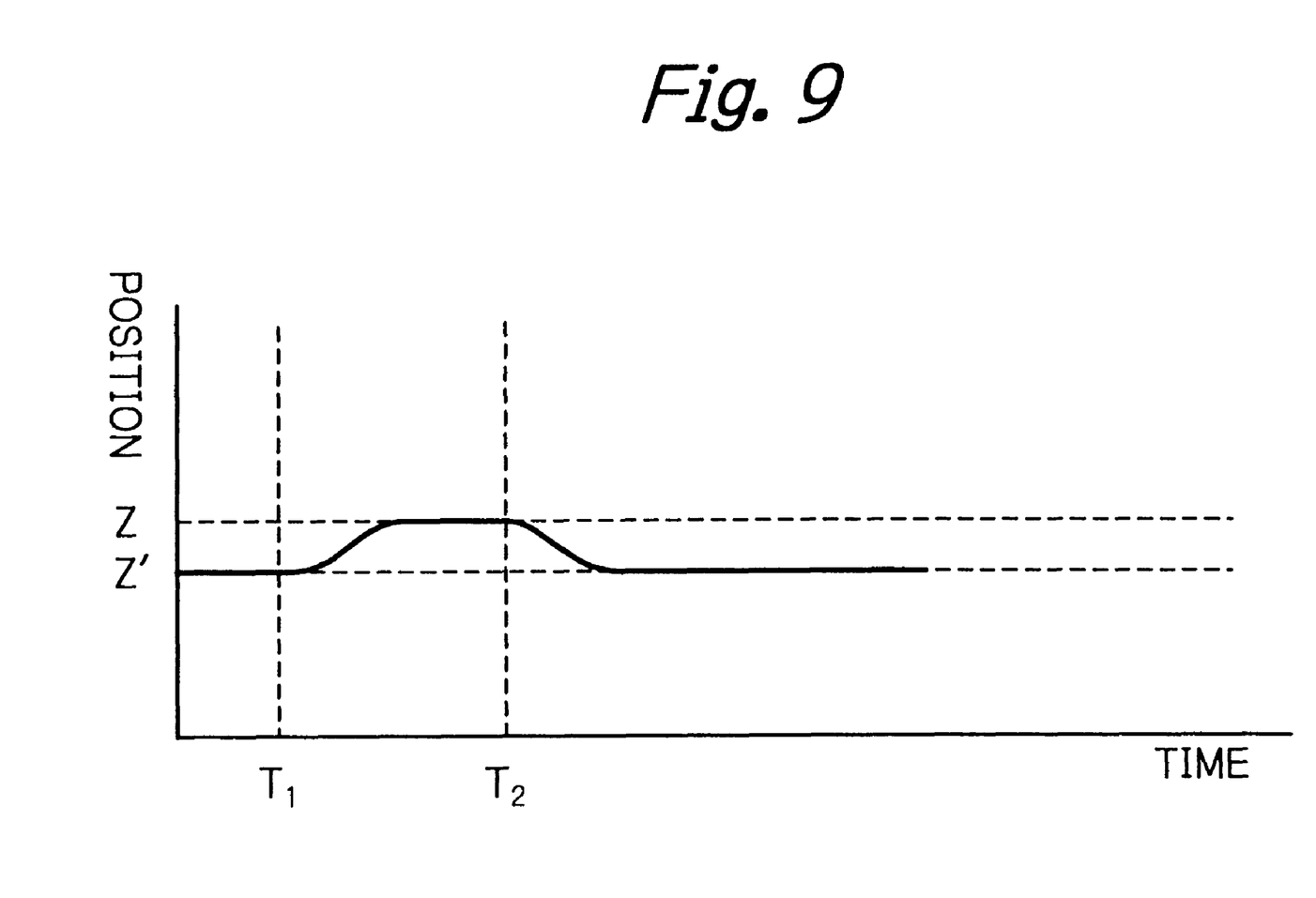
FIG. 9 is a diagram showing the pad position in the motor-driven brake apparatus according to the second embodiment.

Accordingly, as shown in FIG. 9, the inner pad 14 is moved at time T1 from the small clearance position, which is indicated by position Z', to the zero clearance position, indicated by position Z. During this movement, the motor 33 can be controlled so that the inner pad 14 (outer pad 15) shows a smooth moving characteristic curve as shown in FIG. 9. The absolute value of the difference between position Z' and position Z, which are shown in FIG. 9, is 0.05 mm as shown in FIG. 4. In this case, because the clearance is set to a very small value, even if the brake pedal is depressed suddenly, the inner pad 14 (outer pad 15) comes into contact with the disk 13 in an extremely short period of time. Therefore, the brake initial response characteristics improve.

Furthermore, because the locus of movement of the inner and outer pads 14 and 15 is smooth, it is possible to reduce noise generated when the inner pad 14 (outer pad 15) comes into contact with the disk 13.

According to the motor-driven brake apparatus of the above-described second embodiment, when an OFF operation of the accelerator pedal is detected at step S105 and it is detected at step S107 that the vehicle is running, and further a period of time that the motor-driven brake apparatus is not used has exceeded a predetermined time, performance degradation preventing control is carried out in which the motor 33 is controlled to reduce the clearance between the disk 13 and the inner pad 14 (outer pad 15) so that the inner pad 14 (outer pad 15) slightly contacts the disk 13. Consequently, the inner pad 14 (outer pad 15) is temporarily placed in a drag position with respect to the disk 13 to remove dust and water from the area between the disk 13 and the inner pad 14 (outer pad 15).

Accordingly, even when the motor-driven brake apparatus is not used for a long period of time during running of the vehicle, the pad performance will not degrade.

Moreover, only when an OFF operation of the accelerator pedal is detected during running of the vehicle, that is, only when the driver has no intention of accelerating the vehicle, performance degradation preventing control is carried out by bringing the pad and the disk into contact with each other. Therefore, there is no possibility of giving a sense of incongruity to the driver, which would be given if the performance degradation preventing control is carried out when the driver has an intention of accelerating the vehicle.

Accordingly, the performance degradation preventing control can be carried out without giving the driver a sense of incongruity.

What is claimed is:

1. A motor-driven brake apparatus comprising:

a motor;

a converting mechanism for converting rotational motion of said motor into rectilinear motion of a piston;

a position detector for detecting a stroke position of said piston;

a controller for controlling said motor on the basis of a result of detection by said position detector so that a pad is pressed against a disk by the rectilinear motion of said piston to generate braking force; and a running condition detecting device for detecting a running condition of a vehicle, wherein said running condition detecting device includes:

a running detecting sensor for detecting whether or not the vehicle is running; and an accelerator pedal operating condition detecting sensor for detecting an ON/OFF operation of an accelerator pedal;

wherein when it is detected by said running detecting sensor that said vehicle is running, and an OFF operation of said accelerator pedal is detected by said accelerator pedal operating condition detecting sensor, said controller controls said motor so that the clearance between said pad and said disk becomes small.

2. A motor-driven brake apparatus according to claim 1, wherein said position detector detects a stroke position of said piston by detecting a distance between said disk and a part unitary moving with said piston.

3. A motor-driven brake apparatus according to claim 1, wherein said position detector detects a stroke position of said piston by detecting a rotational position of a rotor of said motor.

4. A motor-driven brake apparatus comprising:

a motor;

a converting mechanism for converting rotational motion of said motor into rectilinear motion of a piston;

a position detector for detecting a stroke position of said piston;

a controller for controlling said motor on the basis of a result of detection by said position detector so that a pad is pressed against a disk by the rectilinear motion of said piston to generate braking force; and a running condition detecting device for detecting a running condition of a vehicle, wherein said running condition detecting device has a running detecting sensor for detecting whether or not the vehicle is running, wherein when it is detected by said running detecting sensor that said vehicle is at rest, said controller controls said motor so that the clearance between said pad and said disk becomes zero.

5. A motor-driven brake apparatus according to claim 4, wherein said position detector detects a stroke position of said piston by detecting a distance between said disk and a part unitary moving with said piston.

6. A motor-driven brake apparatus according to claim 4, wherein said position detector detects a stroke position of said piston by detecting a rotational position of a rotor of said motor.

7. A motor-driven brake apparatus comprising:

a motor;

a converting mechanism for converting rotational motion of said motor into rectilinear motion of a piston;

a position detector for detecting a stroke position of said piston;

a controller for controlling said motor on the basis of a result of detection by said position detector so that a pad is pressed against a disk by the rectilinear motion of said piston to generate braking force; and a running condition detecting device for detecting a running condition of a vehicle, wherein said running condition detecting device has a running detecting sensor for detecting whether or not the vehicle is running, wherein when it is detected by said running detecting sensor that said vehicle is running, and said vehicle has been in a non-braked state for a period of time longer than a predetermined time, said controller controls said motor to reduce the clearance between said pad and said disk so that said pad slightly contacts said disk.

8. A motor-driven brake apparatus according to claim 7, wherein said running condition detecting device further has an accelerator pedal operating condition detecting sensor for detecting an ON/OFF operation of an accelerator pedal;

wherein when an ON operation state of the accelerator pedal detected by said accelerator pedal operating condition detecting sensor has continued for a period of time longer than a predetermined time, said controller controls said motor to reduce the clearance between said pad and said disk so that said pad slightly contacts said disk.

9. A motor-driven brake apparatus according to claim 8, wherein said position detector detects a stroke position of said piston by detecting a distance between said disk and a part unitary moving with said piston.

10. A motor-driven brake apparatus according to claim 7, wherein said position detector detects a stroke position of said piston by detecting a distance between said disk and a part unitary moving with said piston.

11. A motor-driven brake apparatus according to claim 7, wherein said position detector detects a stroke position of said piston by detecting a rotational position of a rotor of said motor.

12. A motor-driven brake apparatus comprising:

a motor;

a converting mechanism for converting rotational motion of said motor into rectilinear motion of a piston;

a position detector for detecting a stroke position of said piston;

a controller for controlling said motor on the basis of a result of detection by said position detector so that a pad is pressed against a disk by the rectilinear motion of said piston to generate braking force; and a running condition detecting device for detecting a running condition of a vehicle, wherein said running condition detecting device includes:

a running detecting sensor for detecting whether or not the vehicle is running; and an accelerator pedal operating condition detecting sensor for detecting an ON/OFF operation of an accelerator pedal;

wherein when an OFF operation of said accelerator pedal is detected by said accelerator pedal operating condition detecting sensor and it is detected by said running detecting sensor that said vehicle is running, said controller controls said motor to reduce the clearance between said pad and said disk so that said pad slightly contacts said disk.

13. A motor-driven brake apparatus according to claim 12, wherein when an ON operation of said accelerator pedal is detected by said accelerator pedal operating condition detecting sensor, said controller controls said motor so that the clearance between said pad and said disk becomes a size sufficient to prevent said pad from dragging.

14. A motor-driven brake apparatus according to claim 13, wherein said position detector detects a stroke position of said piston by detecting a distance between said disk and a part unitary moving with said piston.

15. A motor-driven brake apparatus according to claim 12, wherein said position detector detects a stroke position of said piston by detecting a distance between said disk and a part unitary moving with said piston.

16. A motor-driven brake apparatus according to claim 12, wherein said position detector detects a stroke position of said piston by detecting a rotational position of a rotor of said motor.

17. A motor-driven brake apparatus comprising:

a motor;

a converting mechanism for converting rotational motion of said motor into rectilinear motion of a piston;

a position detector for detecting a stroke position of said piston, wherein said position detector detects a stroke position of said piston by detecting a rotational position of a rotor of said motor;

a controller for controlling said motor on the basis of a result of detection by said position detector so that a pad is pressed against a disk by the rectilinear motion of said piston to generate braking force; and a running condition detecting device for detecting a running condition of a vehicle, wherein said controller controls said motor so as to change a clearance between said pad and said disk according to a result of detection by said running condition detecting device.

18. A motor-driven brake apparatus comprising:

a motor;

a converting mechanism for converting rotational motion of said motor into rectilinear motion of a piston;

a position detector for detecting a stroke position of said piston;

a controller for controlling said motor on the basis of a result of detection by said position detector so that a pad is pressed against a disk by the rectilinear motion of said piston to generate braking force, wherein said position detector detects a stroke position of said piston by detecting a distance between said disk and a part unitary moving with said piston; and a running condition detecting device for detecting a running condition of a vehicle, wherein said controller controls said motor so as to chance a clearance between said pad and said disk according to a result of detection by said running condition detecting device.

19. A motor-driven brake apparatus comprising:

a motor;

a converting mechanism for converting rotational motion of said motor into rectilinear motion of a piston;

a position detector for detecting a stroke position of said piston;

a controller for controlling said motor based on a result of a detection by said position detector so that a pad is pressed against a disk in response to the rectilinear motion of said piston to generate a braking force; and an accelerator pedal operating condition detecting sensor for detecting ON/OFF operation of an accelerator pedal, wherein said controller is operable to control said motor so as to change a clearance between said pad and said disk according to a result of a detection by said accelerator pedal operating condition detecting sensor.

20. A motor-driven brake apparatus comprising:

a motor;

a converting mechanism for converting rotational motion of said motor into rectilinear motion of a piston;

a position detector for detecting a stroke position of said piston;

a controller for controlling said motor based on a result of a detection by said position detector so that a pad is pressed against a disk by the rectilinear motion of said piston to generate a braking force; and an accelerator pedal operating condition detecting sensor for detecting ON/OFF operation of an accelerator pedal, wherein when an OFF operation of said accelerator pedal is detected by said accelerator pedal operating condition detecting sensor, said controller controls said motor so that the clearance between said pad and said disk becomes small.

\* \* \* \* \*